United States Patent
Leonard et al.

(10) Patent No.: US 10,807,575 B2
(45) Date of Patent: Oct. 20, 2020

(54) PNEUMATIC CONFIGURATION MODULE FOR ELECTRONIC AIR BRAKE SYSTEM

(71) Applicant: NEW YORK AIR BRAKE, LLC, Watertown, NY (US)

(72) Inventors: Erich Leonard, Clayton, NY (US); Konstantinos Vilaetis, Watertown, NY (US); Ben Kintish, Watertown, NY (US)

(73) Assignee: NEW YORK AIR BRAKE, LLC, Watertown, NY (US)

(*) Notice: Subject to any disclaimer, the term of this patent is extended or adjusted under 35 U.S.C. 154(b) by 229 days.

(21) Appl. No.: 15/267,237

(22) Filed: Sep. 16, 2016

(65) Prior Publication Data
US 2018/0079396 A1 Mar. 22, 2018

(51) Int. Cl.
*B60T 13/66* (2006.01)
*B60T 8/17* (2006.01)
(Continued)

(52) U.S. Cl.
CPC .......... *B60T 8/1705* (2013.01); *B60T 8/3235* (2013.01); *B60T 8/3675* (2013.01); *B60T 13/665* (2013.01);
(Continued)

(58) Field of Classification Search
CPC .... B60T 8/1705; B60T 8/3675; B60T 8/3235; B60T 13/683; B60T 13/665;
(Continued)

(56) References Cited

U.S. PATENT DOCUMENTS 3,253,867 A * 5/1966 Erson ................. B60T 7/14
137/112
3,639,010 A * 2/1972 Mayer ................. B60T 8/1893
303/22.5
(Continued)

FOREIGN PATENT DOCUMENTS

DE 102008009217 A1 8/2009
EP 0829402 A2 3/1998
(Continued)

OTHER PUBLICATIONS

International Search Report and Written Opiniion Form PCT/ISA/220, International Application No. PCT/US2016/052038, p. 1-15, International Filing Date Sep. 16, 2016, mailing date of search report Jun. 17, 2017.
(Continued)

*Primary Examiner* — Bradley T King
(74) *Attorney, Agent, or Firm* — Bond Schoeneck and King PLLC; David Nocilly

(57) ABSTRACT

A modular EAB system that reduces the number of individualized modules but provides the desired functionality using a configuration module that is coupled to a plurality of brake system control modules and has a receptacle interface configured to engage a series of modular sections that can be selected from a variety of options to perform dedicated air brake functions. The dedicated air brake functions included comprise brake pipe cutout, equalizing reservoir backup, brake pipe emergency, automatic flow calibration, dead engine regulator, dynamic brake interlock, emergency limiting valve regulation, dynamic brake interlock and emergency limiting valve regulation, 20 pipe back up, and brake cylinder cutout.

13 Claims, 14 Drawing Sheets

(51) Int. Cl.
*B60T 15/02* (2006.01)
*B60T 15/04* (2006.01)
*B60T 15/18* (2006.01)
*B60T 13/68* (2006.01)
*B60T 8/32* (2006.01)
*B60T 17/22* (2006.01)
*B60T 8/36* (2006.01)

(52) U.S. Cl.
CPC .......... *B60T 13/683* (2013.01); *B60T 15/027* (2013.01); *B60T 15/048* (2013.01); *B60T 15/184* (2013.01); *B60T 17/228* (2013.01)

(58) Field of Classification Search
CPC .... B60T 15/027; B60T 15/048; B60T 15/184; B60T 17/228
See application file for complete search history.

(56) References Cited

U.S. PATENT DOCUMENTS

| | | | | |
|---|---|---|---|---|
| 6,035,250 | A * | 3/2000 | Newton | B60T 13/665 246/182 B |
| 6,086,163 | A * | 7/2000 | Klink | B60T 17/043 303/128 |
| 6,098,006 | A * | 8/2000 | Sherwood | B60T 13/665 303/128 |
| 6,142,580 | A * | 11/2000 | Sinn | B60T 13/665 174/113 R |
| 2007/0270006 | A1 | 11/2007 | Herges | |
| 2011/0031073 | A1* | 2/2011 | Stoff | B60T 17/02 188/107 |
| 2011/0273004 | A1 | 11/2011 | Mann et al. | |
| 2016/0075346 | A1* | 3/2016 | Wright | B61C 17/12 701/19 |

FOREIGN PATENT DOCUMENTS

| | | |
|---|---|---|
| EP | 0989040 A2 | 3/2000 |
| WO | 9529831 A1 | 11/1995 |
| WO | 1995029831 A1 | 11/1995 |
| WO | 0222421 A2 | 3/2002 |
| WO | 2002022421 A2 | 3/2002 |
| WO | 2006045489 A1 | 5/2006 |
| WO | 2010034477 A1 | 4/2010 |

OTHER PUBLICATIONS

Examination Report for standard patent application, provided by the Australian Government IP Australia, dated Nov. 19, 2019, pp. 1-3.

* cited by examiner

PNEUMATIC CONFIGURATION MODULE FOR ELECTRONIC AIR BRAKE SYSTEM

BACKGROUND OF THE INVENTION

1. Field of the Invention

The present invention relates to pneumatic braking systems and, more particularly, to an electronic air brake pneumatic configuration module that isolates other modules from application variability.

2. Description of the Related Art

Electronic air brake (EAB) systems have provided braking functions in a modularized way since the inception of CCB-II and its competitors. These systems group major brake functionality, such as emergency reservoir (ER) control, brake pipe (BP) control, multiple unit (20) pipe control, etc. into distinct modules that can be attached to and removed from a brake control panel having the appropriate pneumatic connections. The modules are typically configured so that functions that interact with each other to exist on the same module, thereby simplifying the pneumatic piping that is needed between modules.

EAB systems are used by many different locomotive operators and each operator may have specific desired functionality that differs from other operators. As a result, the number of distinct EAB hardware modules that must be designed and maintained can be overwhelming. As these specific or custom hardware modules are selected and then coupled together in various combinations, the variable nature of EAB systems increases even more. For example, one operator may have a different dynamic brake interlock (DBI) module than another operator, a brake cylinder control module with or without a dynamic brake interlock (DBI) magnet valve (MV), and a pneumatic brake tripe valve portion (DBTV) without or without DBI MV. Just these options result in at least four different system configurations. When all of the requisite modules and module options are considered, the number of possible variations increases geometrically.

This highly variable approach to EAB systems has a number of negative impacts. First, each module and each module variation must be designed independently. Second, manufacturing costs are high due to the need to document the specifications, assembly/installation instructions, and user instructions for each module variation. Third, manufacturing lead times can be high as it is harder to predict the demand for, and appropriately stock, highly individualized modules. Fourth, manufacturing testing demands are increased as each variation must be tested for design verification and for production verification. Fifth, EAB system assembly is more complicated as each system may have a distinct combination of modules. Finally, maintenance and repair is more difficult and prone to error due to the number of systems that must be tracked and repaired (and the number of spare parts that must be on hand for those repairs). Accordingly, there is a need for a modular EAB system that reduces the number of individualized modules but provides the desired functionality.

BRIEF SUMMARY OF THE INVENTION

The present invention is a modular EAB system that reduces the number of individualized modules but provides the desired functionality by including a plurality of conventional brake system control modules, such as a brake pipe control module, brake cylinder control module(s), multiple unit pipe control module(s), backup equalizing reservoir control module, and backup brake cylinder control module (s), along with a configuration module that is coupled to the plurality of brake system control modules and has a common receptacle interface to the manifold configured to engage a series of selectable variants of modular sections that perform a corresponding series of dedicated air brake functions. In addition, the configuration module provides localized non-functional features, including test point type and cut out cocks with or without monitoring. The dedicated air brake functions performed by the series of sections comprise brake pipe cutout, equalizing reservoir backup, brake pipe emergency, automatic flow calibration, dead engine regulator, dynamic brake interlock, emergency limiting valve regulation, dynamic brake interlock and emergency limiting valve regulation, 20 pipe back up (20BU), and brake cylinder cutout pressure monitoring. The receptacle interface that couples to the section corresponding with brake pipe cutout comprises a brake pipe relay output (BPRO) pressure port, a brake pipe feedback (BPFB) pressure port, a brake pipe vent valve (BPVV) pressure port, a brake pipe (BP) pressure port, and a brake pipe cutout pilot pressure port. The receptacle interface that couples to the section corresponding with equalizing reservoir backup comprises a main reservoir (MR) pressure port, a 10P pressure port, a brake pipe relay pilot (BPRP) port, a brake pipe electronic control (BPEC) pressure in port, a BPEC pressure out port, a pneumatic equalizing reservoir (PER) pressure port, a reduction limiting valve (RLV) pressure port, an equalizing reservoir backup (ERBU) exhaust port, an ERBU out port, and a pilot valve for power loss (PVPL) pressure port. The receptacle interface that couples to the section corresponding with brake pipe emergency comprises a 21 pipe (21P) pressure port and a brake pipe (BP) pressure port. The receptacle interface that couples to the section corresponding with automatic flow calibration (AFC) comprises a brake pipe (BP) pressure port. The receptacle interface that couples to the section corresponding with dead engine regulator comprises a main reservoir pressure (MR) port and a brake pipe (BP) pressure port. The receptacle interface that couples to the section corresponding with dynamic brake interlock comprises a main reservoir (MR) pressure port, a 13P port, and a bail off BO pressure port. The receptacle interface that couples to the section corresponding with emergency limiting valve regulation comprises a main reservoir (MR) pressure port, a brake pipe (BP) pressure port, a bail off BO pressure port, and an emergency limiting valve (ELV) pressure port. The receptacle interface that couples to the section corresponding with dynamic brake interlock and emergency limiting valve regulation comprises a distributor valve (DV1) pressure port, an emergency limiting valve pressure port, a brake cylinder back up (BCBU1) pressure port, and a brake cylinder back up (BCBU2) pressure port. The receptacle interface that couples to the section corresponding with 20 pipe back up (20BU) comprises a pilot valve for power loss (PVPL) pressure port, a 20 pipe (20P) pressure port, and a brake cylinder (BC1) pressure port. The receptacle interface that couples to the section corresponding with brake cylinder cutout comprises a first brake cylinder cutout (BCCO1) pressure port and a second brake cylinder cutout (BCCO2) pressure port.

The present invention also include a method of providing an electronic air brake system, comprising the steps of providing a plurality of brake system control modules and a configuration module coupled to the plurality of brake system control modules, wherein the configuration module has a receptacle interface configured to engage a series of sections performing a series of corresponding dedicated air brake functions, selecting the series of sections from a plurality of optional sections, and then assembling the selected series of sections to the receptacle interface to form a complete air brake system.

BRIEF DESCRIPTION OF THE SEVERAL VIEWS OF THE DRAWING(S)

The present invention will be more fully understood and appreciated by reading the following Detailed Description in conjunction with the accompanying drawings, in which:

FIG. 1 is a schematic of an electronic air brake system with reduced individuality of chief modules according to the present invention;

FIGS. 2A and 2B ares a diagram of a configuration module for an electronic air brake system according to the present invention;

DETAILED DESCRIPTION OF THE INVENTION

Figure 1:
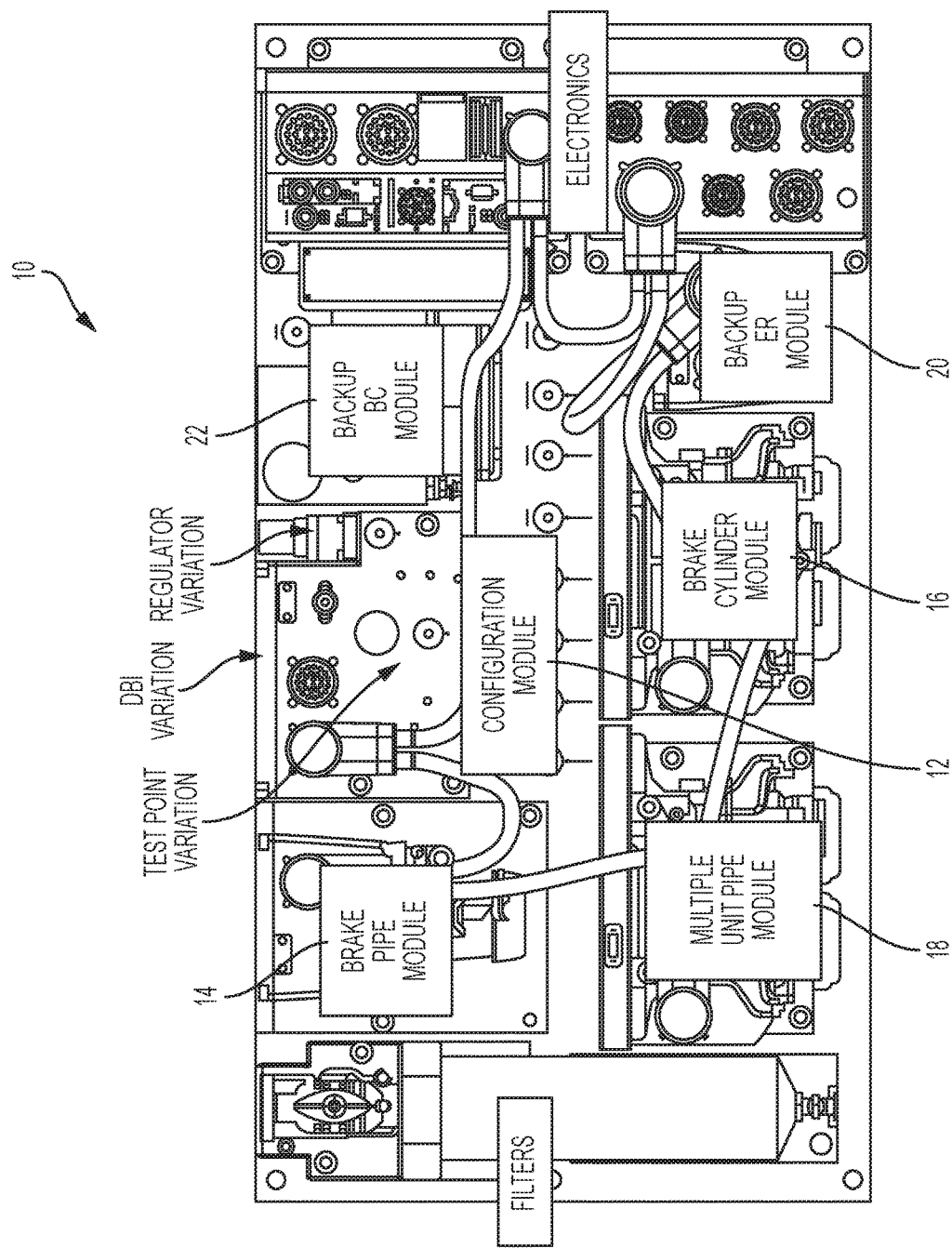

Referring to the figures, wherein like numerals refer to like parts throughout, there is seen in FIG. 1 an electronic air brake (EAB) system 10 having a configuration module 12 housing all of the functions that are subject to variation. Configuration module 12 communicates with core modules that provide non-variable hardware braking system functionality. For example, as seen in FIG. 1, configuration module 12 is in communication with a brake pipe (BP) control module 14, brake cylinder (BC) control module 16, multiple unit (MU) pipe control module 18, backup equalizing reservoir (ER) control module 20, and backup brake cylinder (BC) control module 22. It should be recognized that multiple versions of each module could be included for redundancy. The BP control module 14, BC control module 16, MU pipe control module 18, backup ER control module 20, and backup BC control module 22 differ from conventional EAB system modules in that the components of these modules have been limited to those providing just the core functionality without physical hardware variations (software variations may be possible without impacting the advantages provided by configuration module 12. Any possible variations in the functionality desired by these modules have been structurally relocated to new configuration module 12. As a result, BP control module 14, BC control module 16, MU pipe control module 18, backup ER control module 20, and backup BC control module 22 will be the same for every installation of EAB system 12, thereby significantly reducing the amount of variability in manufacturing, installation, and maintenance as only a single design for each module needs to be manufactured, stocked, documents, supported, installed, repaired, etc.

Configuration module 12 is configured to interact with BP control module 14, BC control module 16, MU pipe control module 18, backup ER control module 20, and backup BC control module 22 based on inputs and outputs and communication messages from those components in the system and according to instructions provided by the operator of a locomotive having EAB system 10. Configuration module 12 may also contain diagnostics so that it can self-diagnose hardware failures, inform the system of its status, and log prior recorded information for troubleshooting and root cause analysis of module returns to the original manufacture.

Figure 2A:
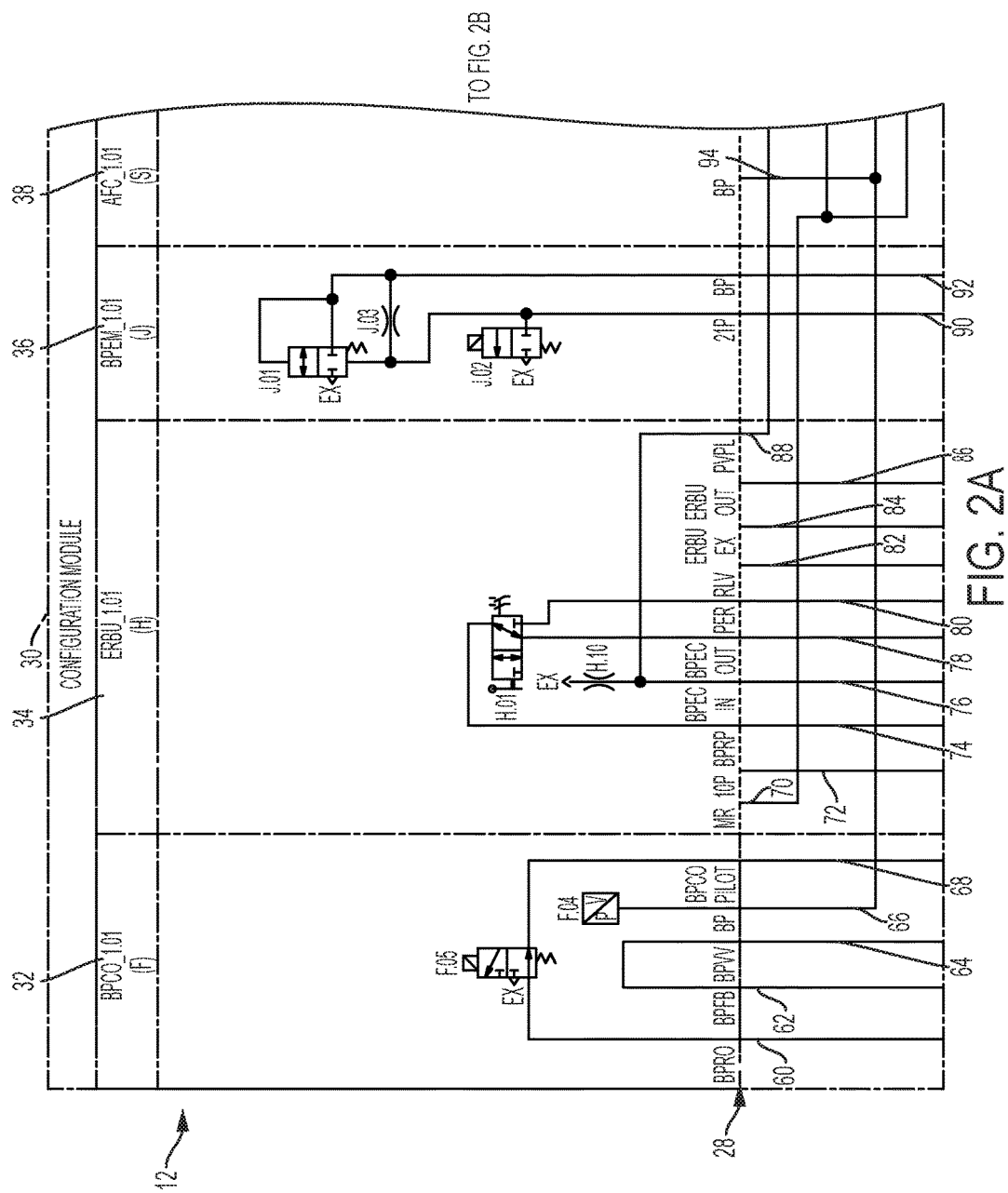
Figure 2B:
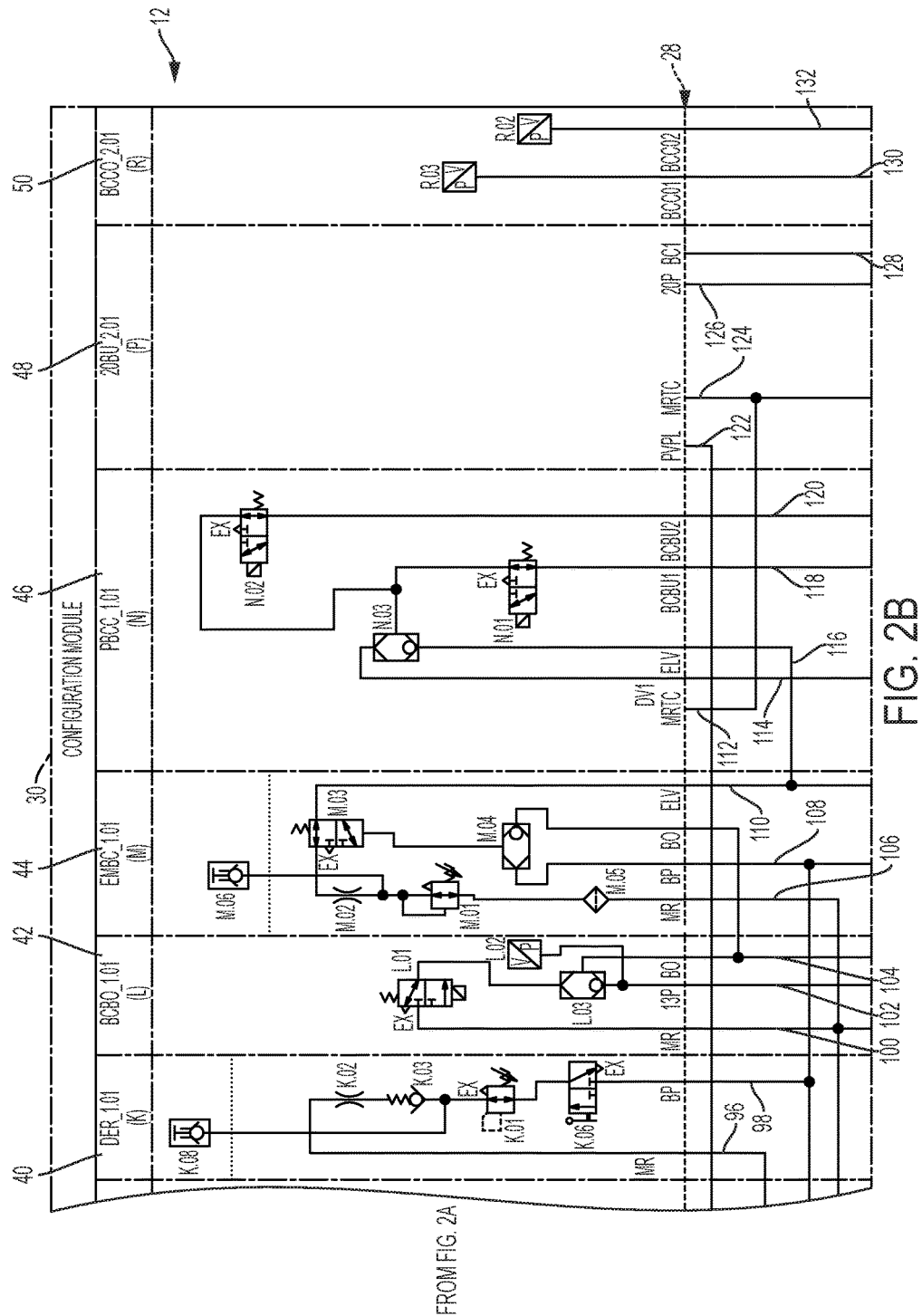

Referring to FIGS. 2A and 2B, configuration module 12 may be organized into functional sections 30 representing the variant functionality desired in EAB system 10 and having the associated structural component for delivering that functionality. For example, configuration module 12 is shown with ten discrete functional sections 30 that are interconnected to BP control module 14, BC control module 16, MU pipe control module 18, backup ER control module 20, and backup BC control module 22 via conventional pneumatic piping and electronics. More specifically, configuration module 12 may include a brake pipe cutout (BPCO) 32, an equalizing reservoir backup (ERBU) 34, a brake pipe emergency (BPEM) section 36, an automatic flow calibration (AFC) section 38, a dead engine regulator (DER) section 40, a dynamic brake interlock (BCBO) section 42, an emergency limiting valve regulator (EMBC) section 44, a dynamic brake interlock and emergency limiting valve regulator (PBCC) section 46, a 20 pipe back up (20BU) section 48, and a brake cylinder cutout (BCCO) section 50. Each section is illustrated in FIGS. 2A and 2B as one of potentially several variations allowable under the Association of American Railroads (AAR) regulations and thus includes the appropriate electronically controlled valves, chokes, check valves, etc. needed to provide the desired brake system functionality for that acceptable variation. It should be recognized that comparable section may be provided that comply with other national of regional authorities, such as those promulgated and in force in China, India, South Africa, and Australia.

According to the present invention, each of BPCO section 32, ERBU section 34, BPEM section 36, AFC section 38, DER section 40, BCBO section 42, EMBC section 44, PBCC section 46, 20BU section 48, and BCCO section 50 may be substituted with a comparable section that provides different user-specific functionality so that all variations of EAB system 10 are made via changes to configuration module 12 rather than BP control module 14, BC control module 16, MU pipe control module 18, backup ER control module 20, and backup BC control module 22.

Figure 3:
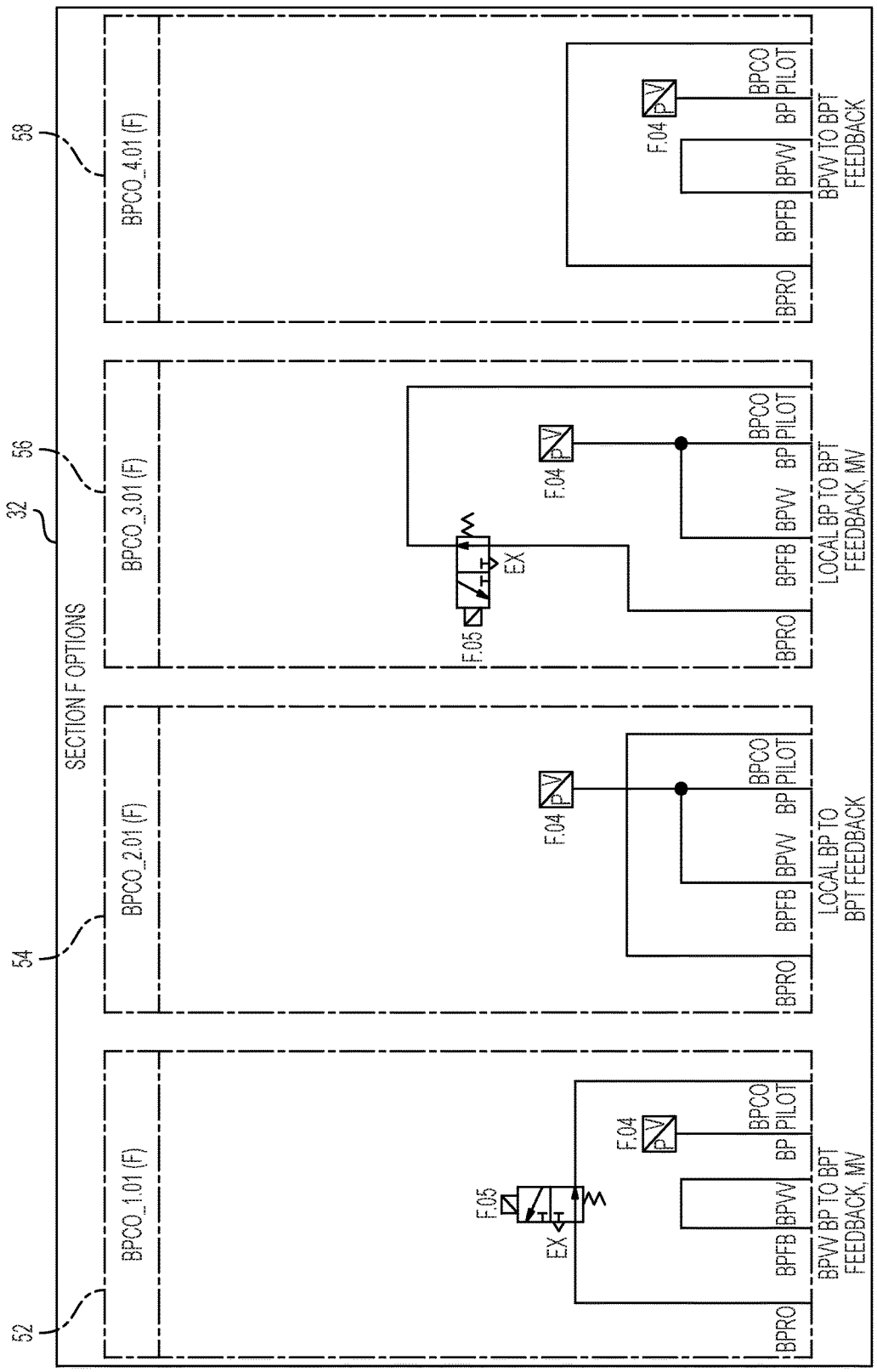
FIG. 3 is a diagram of a brake pipe cutout section for a configuration module for an electronic air brake system according to the present invention.

For example, as seen in FIG. 3, BPCO section 32 may be provided in one of at least four variations depending on end user requirements. A first variation 52 may provide for brake pipe vent valve (BPVV) and BP feedback to brake pipe transducer (BPT) feedback along with a secondary BPCO control magnet valve, a second variation 54 may provide for local BP to BPT feedback, a third variation 56 may provide for BP to BPT feedback along with a secondary BPCO control magnet valve (MV), and a fourth variation 58 may provide BPVV to BPT feedback. In order to provide this functionality in a modular fashion, configuration module 12 includes structure providing a BPRO pressure port 60, a BPFB pressure port 62, a brake pipe vent valve pressure port 64, a brake pipe pressure port 66, and a brake pipe cutout pilot pressure port 68. In this manner, configuration module 12 will provide the necessary connectivity for whichever variation 52, 54, 56, or 58 is ultimately as part of configuration module 30. Those of skill in the art should appreciate that conventional pneumatic and electronical components may be used in variations 52, 54, 56, or 58 to accomplished the desired functionality and that the specific structure shown in FIG. 3 for accomplishing the structure merely illustrative. Similar variations may be made in the remaining sections, as seen in FIGS. 4 through 12.

Referring to FIGS. 2A and 2B, configuration module 12 includes a receptacle interface 28 having dedicated receiving locations for connecting to each of BPCO section 32, ERBU section 34, BPEM section 36, AFC section 38, DER section 40, BCBO section 42, EMBC section 44, PBCC section 46, 20BU section 48, and BCCO section 50. Receptacle interface 28 is illustrated in FIG. 3 by the dotted line extending between the specific pneumatic lines and structure of each functional section 30. Receptacle interface 28 may comprise any known structure for interconnecting air brake components, such as pipe brackets, pneumatic lines, drilled holes, milled pathways, plugs, inserts, etc. As further seen in FIGS. 2A and 2B, receptacle interface 28 may include multiple instances of a particular connection, such as the coupling to a source of a brake pipe pressure, as multiple functional sections 30 may need to connect to that source. Similarly, receptacle interface 28 may include couplings to sources that are not used by every variation of functional sections 30 and thus do not actually connect to the internal components of every variation of functional sections 30 but are provided for those variations that do require the connection. Configuration module 12 is structured so that its main body can be a machined block of the same design for all variations of the functional sections. Functional sections 32, 34, 36, 38, 40, 42, 44, 46, 48, and 50 are standardized so that each variation can positioned in the same location within the main body of configuration module 12. The interface of each section to configuration module 12, and configuration module 12 to the underlying manifold (and the internal machining) are represented in FIGS. 2A and 2B and depicted by interface 28. As an example, the BP pressure port seen in FIG. 3 can be configured as plugs that connect to BPFB and the BP transducer, or to only connect to the BP transducer. Similarly, the magnet valve can be populated or replaced with a plug that allows the air to connect between BPRO and BPCO pilot depending on the particular variation. Thus, receptacle 28 of configuration module 12 is adapted to connect to any one of the variations of BPCO section 32 in one location. BPRO pressure port 60, BPFB pressure port 62, brake pipe vent valve pressure port 64, a brake pipe pressure port 66, and brake pipe cutout pilot pressure port 68 are similarly arranged so that any one of the various options seen in FIG. 3 can be attached in its designated position in configuration module 12 and placed into communication with whichever of ports are required by the functionality performed by that variation.

Referring to FIG. 3, the functions provided by BPCO section 32 are an optional secondary BPCO control function and an option of whether the pressure sent to the BPFB transducer in the BPCM is monitoring the BPVV or the BP pressure. The secondary BPCO function is desired by some operators and not desired by others, while BPFB monitoring is dependent on the piping design of a locomotive builder.

Figure 4:
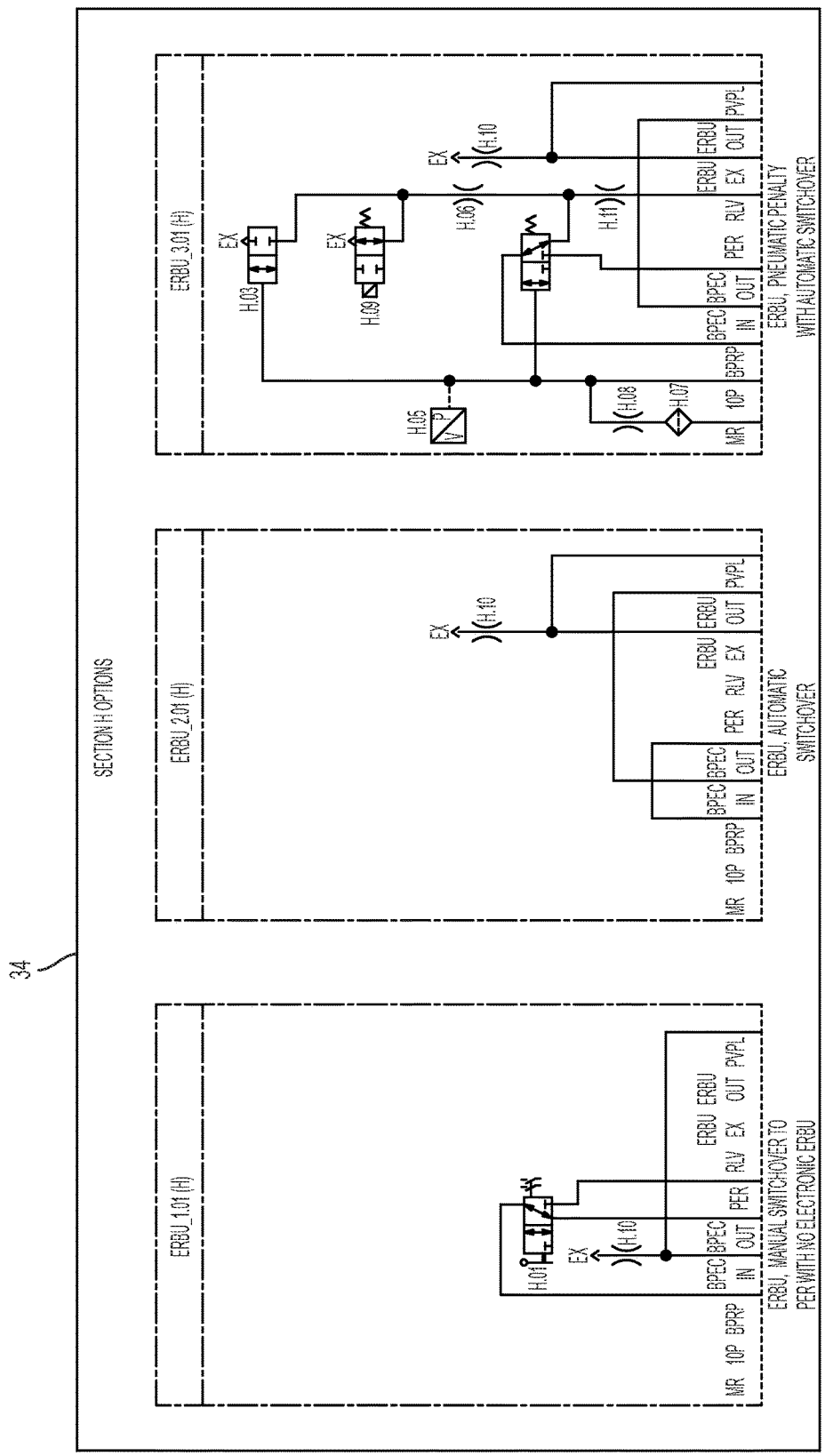
FIG. 4 is a diagram of an equalizing reservoir backup section for a configuration module for an electronic air brake system according to the present invention.
Figure 5:
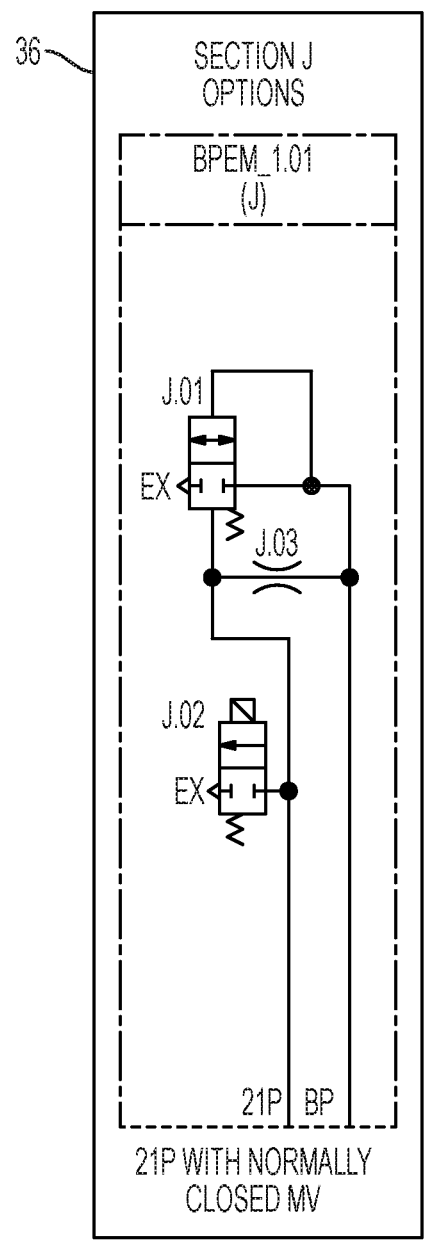
FIG. 5 is a diagram of a brake pipe emergency section for a configuration module for an electronic air brake system according to the present invention.

The portion of receptacle 28 of configuration module 12 that is adapted to connect to any one of the variations of ER backup section 34 includes a main reservoir pressure port 70, a 10 pipe pressure port 72, a BPRP port 74, a BPEC pressure in port 76, a BPEC pressure out port 78, a PER pressure port 80, an RLV pressure port 82, an ERBU exhaust port 84, an ERBU out port 86, and a PVPL pressure port 88. Referring to FIG. 4 the functions provided by this section are manual or automatic switchover to the ER back up system, the use of a pneumatic ER backup system or the electronic ERBU system, a connection to a pneumatic penalty braking system interface through 10 pipe, and the connection to the PVPL function for charging of brake cylinder equalizing pipe on loss of power, Configuration module 12 further includes a 21 pipe pressure port 90 and a brake pipe pressure port 92 to accept and connect to BPEM section 36. Referring to FIG. 5 the functions provided by this section are initiation of emergency braking from a locomotive system other than the EAB, and local initiation of emergency brake pipe venting.

Figure 6:
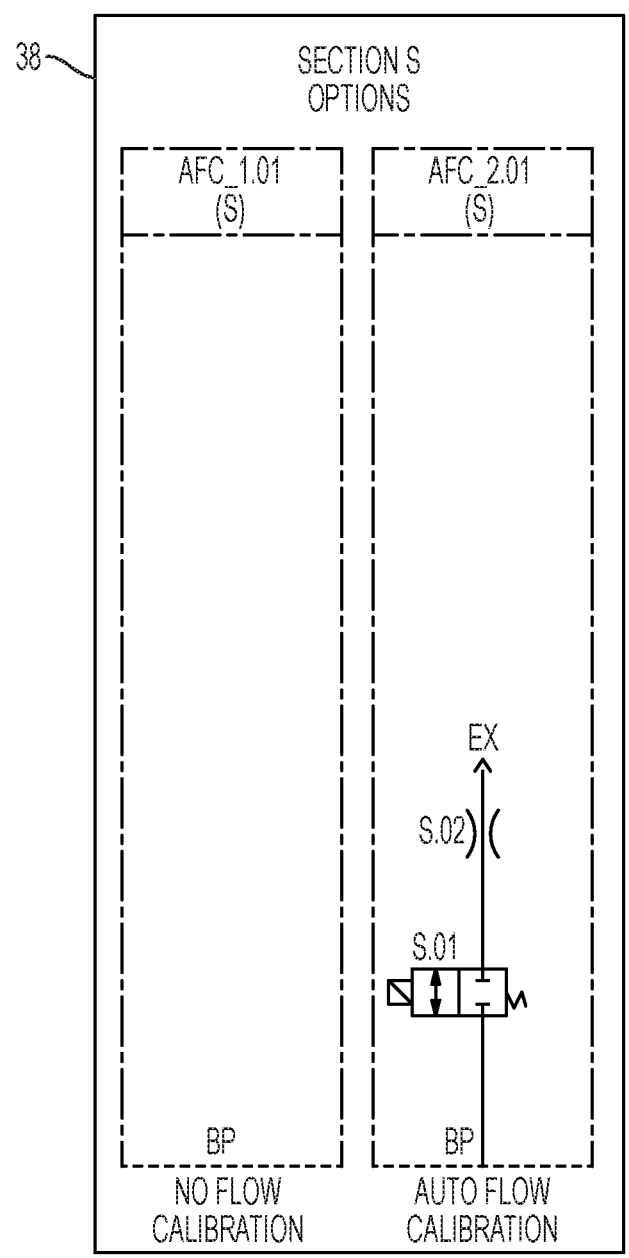
FIG. 6 is a diagram of an automatic flow calibration section for a configuration module for an electronic air brake system according to the present invention.

Configuration module 12 also includes a brake pipe pressure port 94 for connection to AFC section 38. Referring to FIG. 6 the functions provided by this section are the automatic flow calibration magnet valve and choke.

Figure 7:
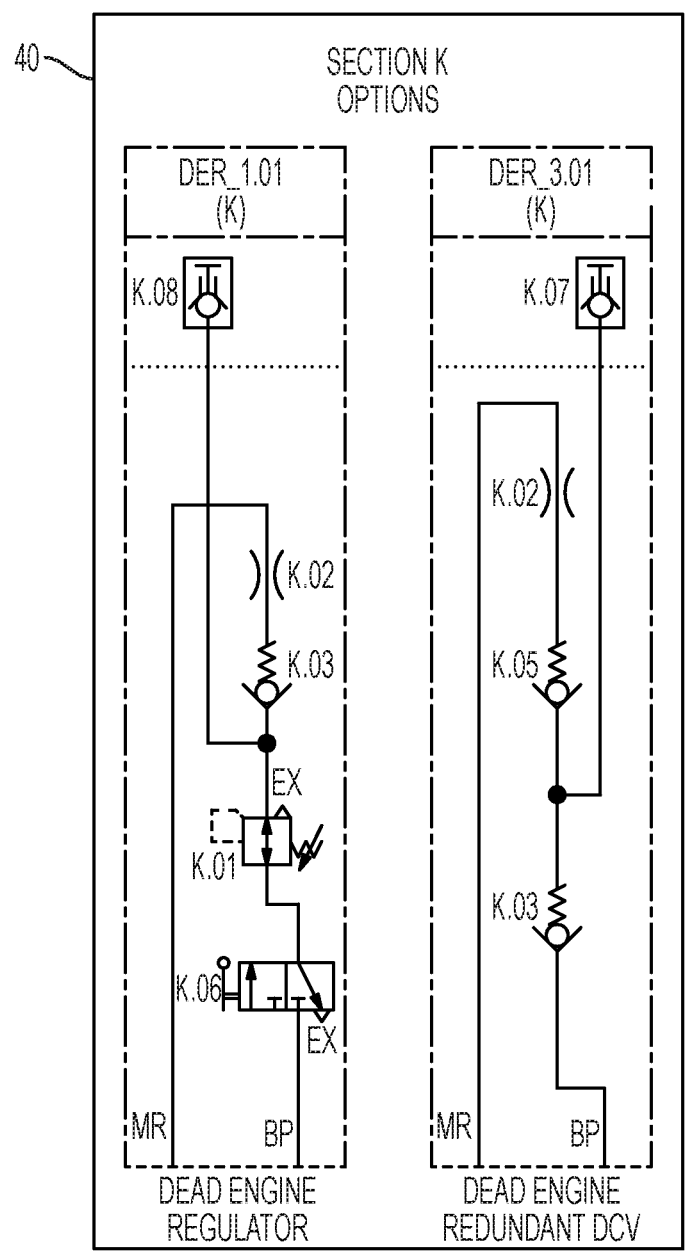
FIG. 7 is a diagram of a dead engine regulator section for a configuration module for an electronic air brake system according to the present invention.

Configuration module 12 further includes a main reservoir pressure port 96 and a brake pipe pressure port 98 for coupling to DER section 40. Referring to FIG. 7 the functions provided by this section are the cut-in of the dead-in-tow function with a configurable reduction of BP pressure to feed MR in a dead-in-tow operation and the use of BP through check valves to charge MR whenever it is less than BP.

Figure 8:
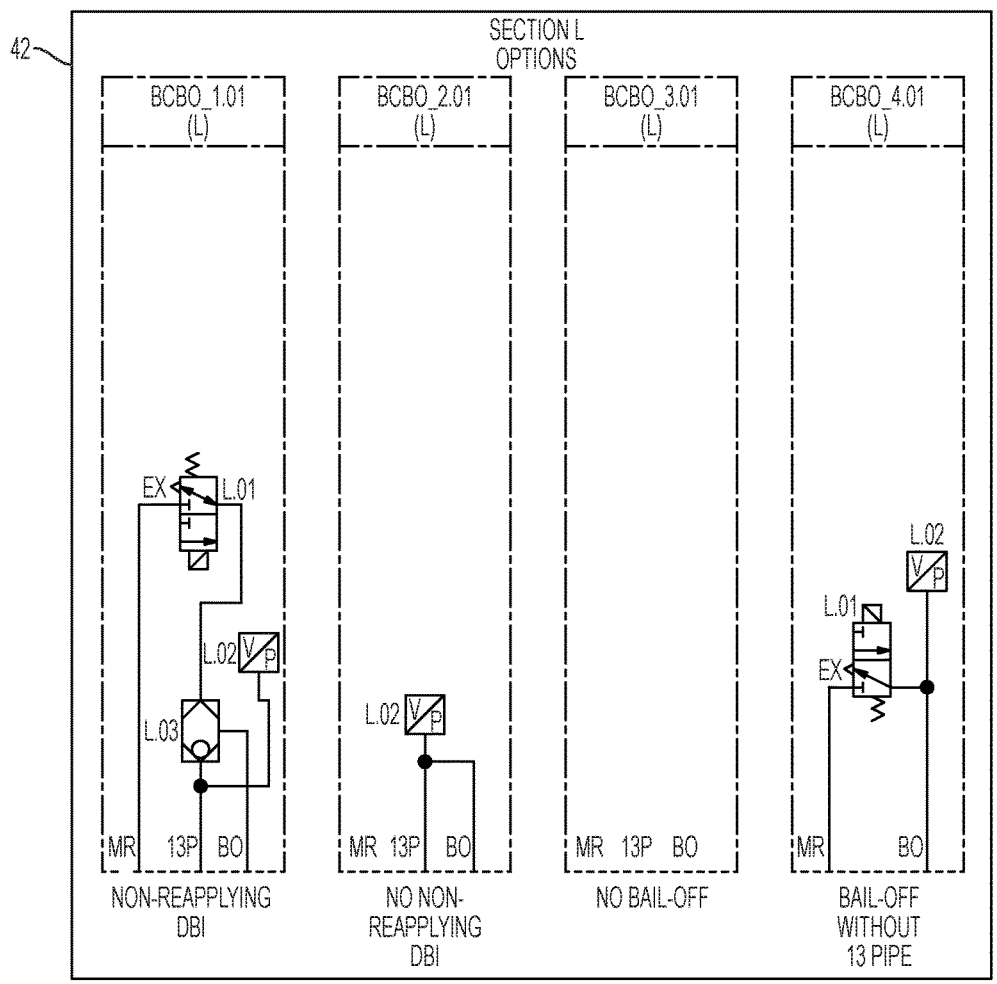
FIG. 8 is a diagram of a dynamic brake interlock section for a configuration module for an electronic air brake system according to the present invention.

Similarly, configuration module 12 is connected to BCBO section 42 by providing a main reservoir pressure port 100, a 13 pipe port 102, and a BO pressure port 104. Referring to FIG. 8 the functions provided by this section are the combination of the non-resetting style DBI and the 13 pipe to command a bail off, the monitoring of the 13 pipe pressure, the bail off function without DBI non-resetting function, systems with no bail off, and systems that have bail-off, but no 13 pipe control.

Figure 9:
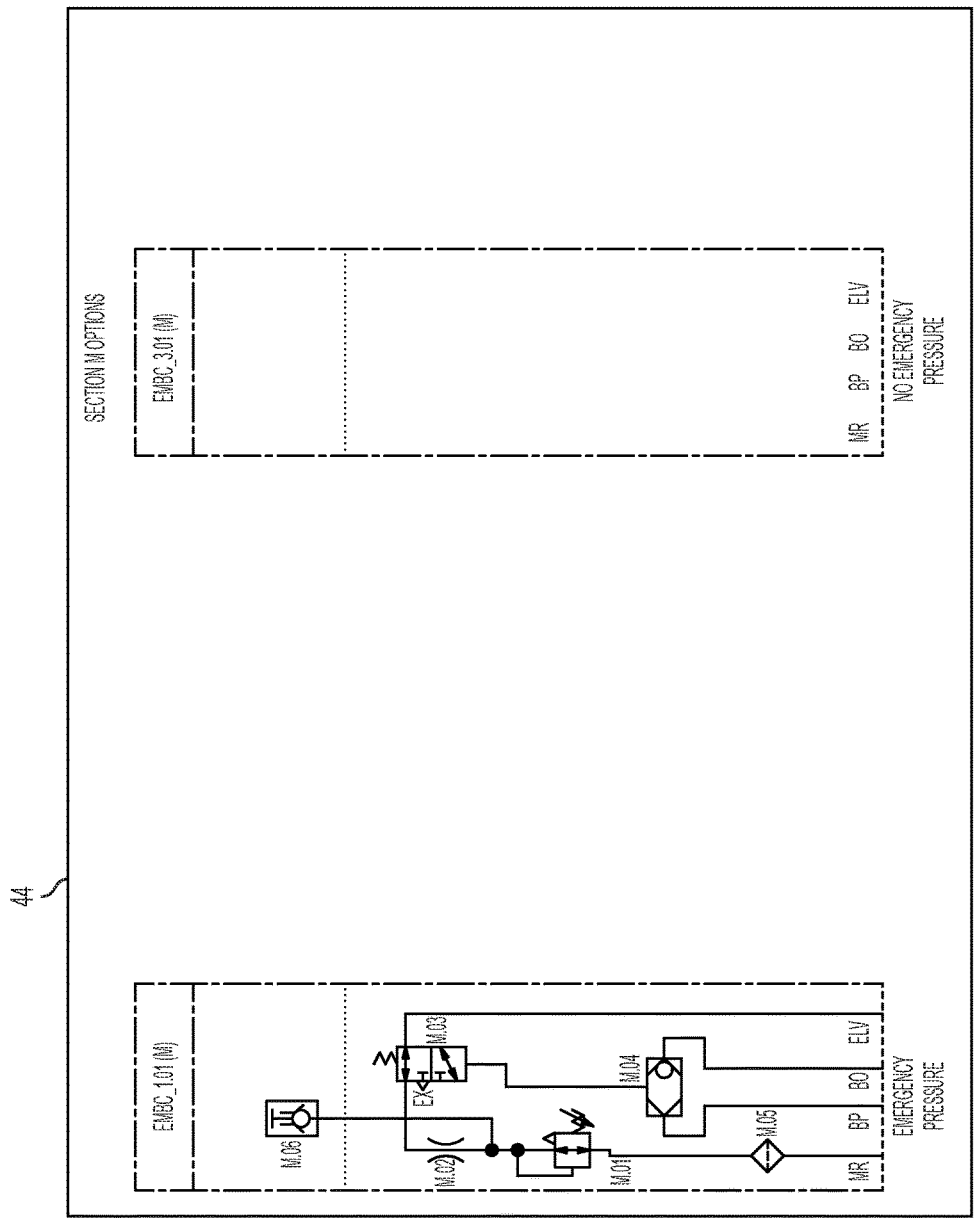
FIG. 9 is a diagram of an emergency limiting valve regulator section for a configuration module for an electronic air brake system according to the present invention.

Configuration module 12 includes a main reservoir pressure port 106, a brake pipe pressure port 108, a BO pressure port 110, and an emergency limiting valve pressure port 112 for coupling to EMBC section 44. Referring to FIG. 9 the functions provided by this section are the creation of a regulated emergency brake cylinder pressure at a configurable level sourced from MR pressure or the absence of this function.

Figure 10A:
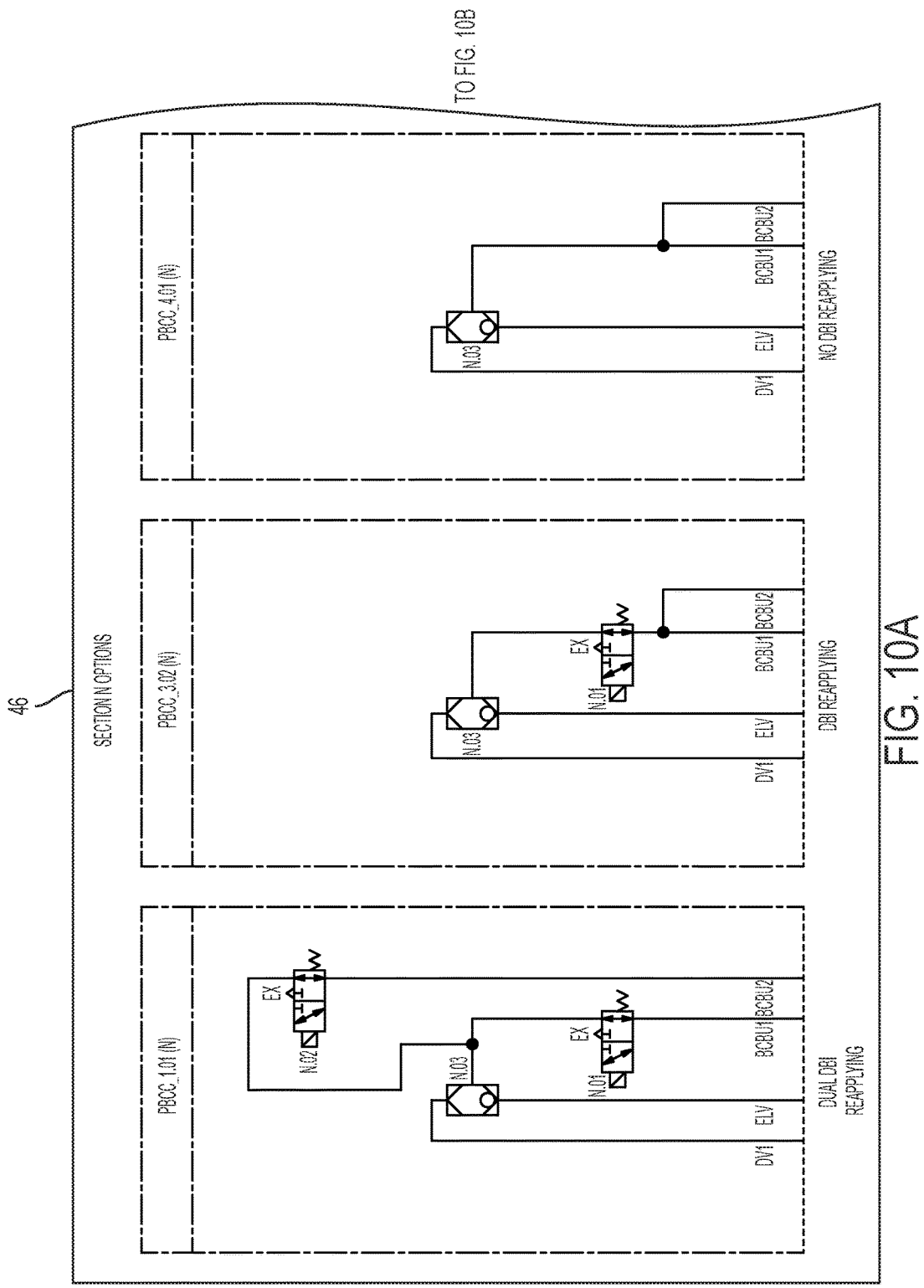
FIGS. 10A and 10B is a diagram of a dynamic brake interlock and emergency limiting valve regulator section for a configuration module for an electronic air brake system according to the present invention.
Figure 10B:
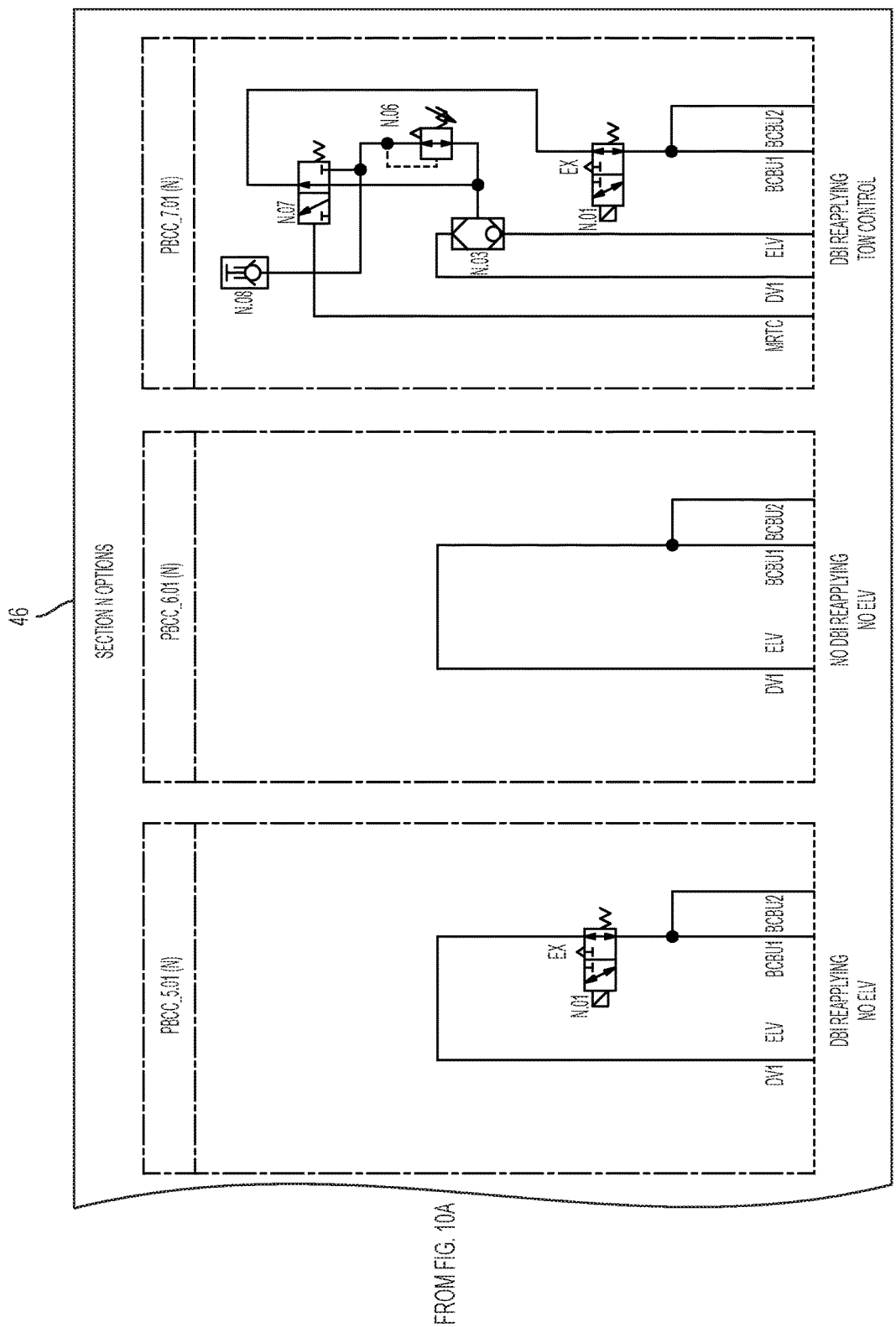

Configuration module 12 also includes an MRTC port 112, DV1 pressure port 114, an emergency limiting valve pressure port 116, a BCBU1 pressure port 118, and a BCBU2 pressure port 120 for connecting to PBCC section 46. Referring to FIGS. 10A and 10B, the functions provided by this section are the combination of the distributor valve pressure with the ELV pressure or the absence of the ELV pressure, DBI resetting with dual or single bogie DBI control or the absence of DBI resetting, and the configurable reduction of BC for towing mode.

Figure 11:
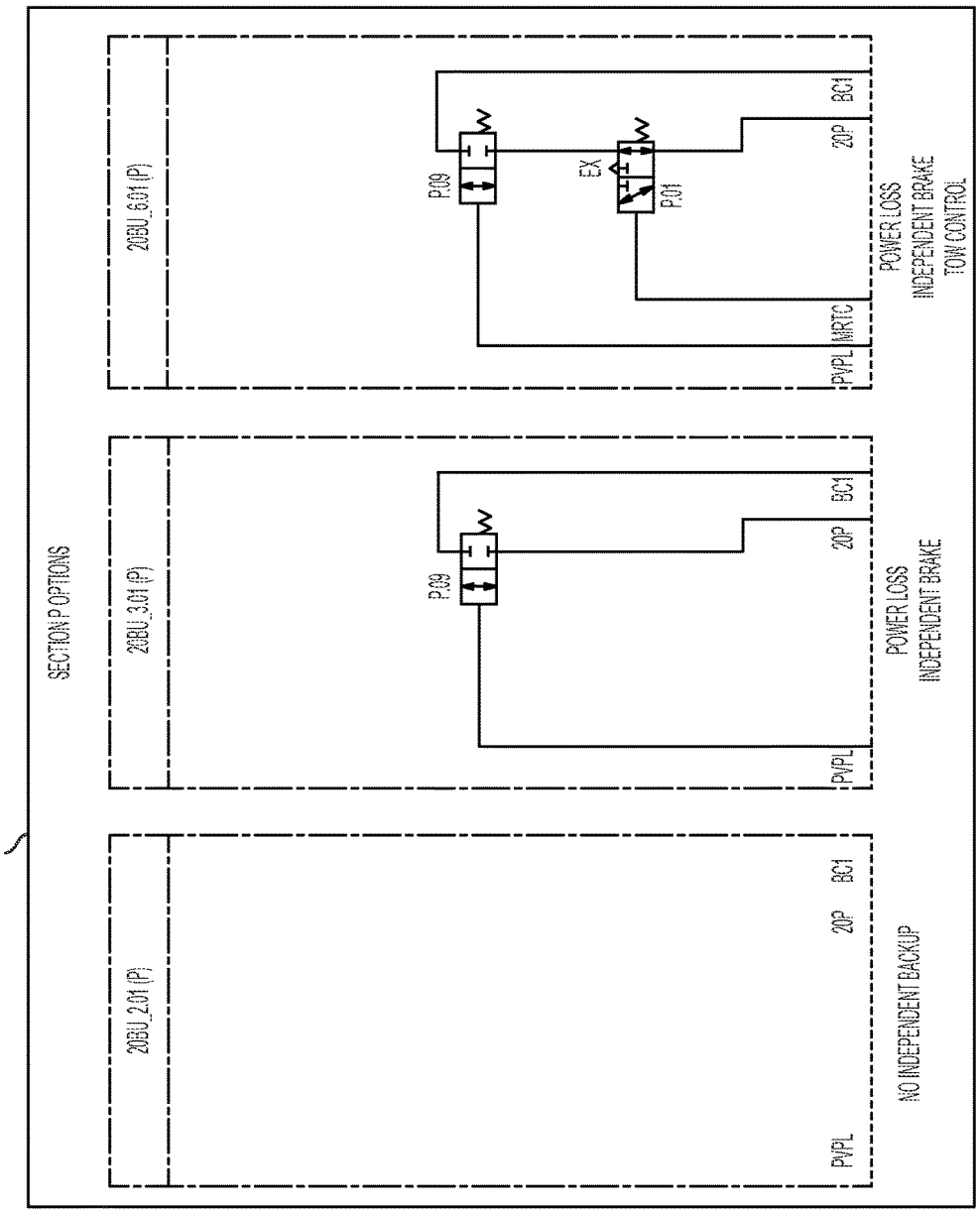
FIG. 11 is a diagram of a 20 pipe back up section for a configuration module for an electronic air brake system according to the present invention.

Configuration module 12 additionally includes a PVPL pressure port 122, an MRTC port 124, a 20 pipe pressure port 126, and a BC1 pressure port 128 for receiving 20BU section 48. Referring to FIG. 11 the functions provided by this section are the connection of the BC1 pressure to the 20 pipe pressure for charging of 20 pipe during a loss of power on a brake cylinder equalizing pipe system, the exhaust of 20 pipe for towing mode, or the absence of these functions for systems without brake cylinder equalizing pipe.

Figure 12:
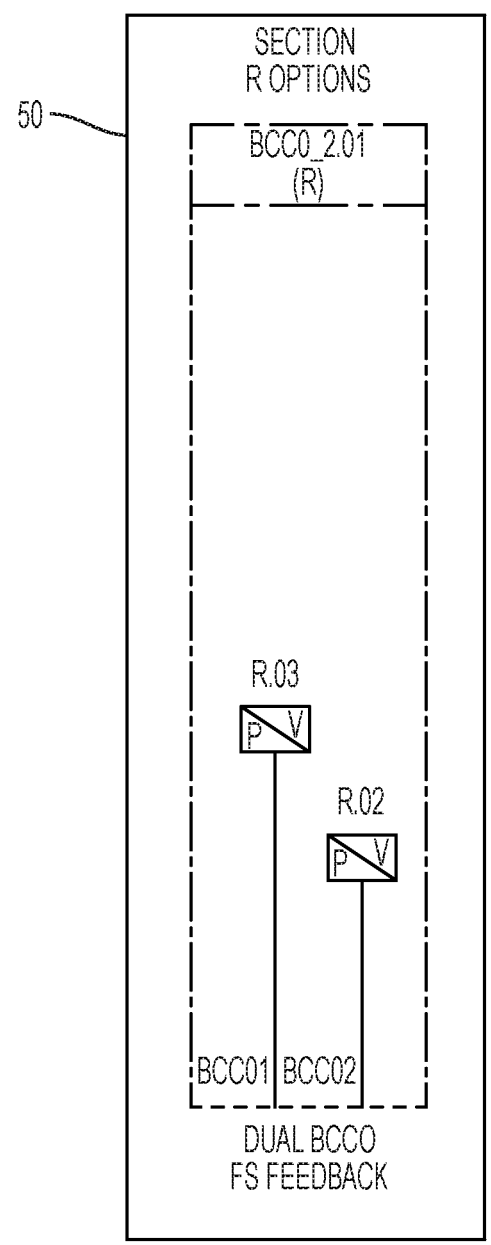
FIG. 12 is a diagram of a brake cylinder cutout section for a configuration module for an electronic air brake system according to the present invention.

Finally, configuration module 10 connects to BCCO section 50 with a first brake cylinder cutout pressure port 130 and a second brake cylinder cutout pressure port 132. Referring to FIG. 12, the functions provided by this section are the measurement of the BC pressures of one or two bogies via one or two (or more) transducers after the cut-out cocks for BC.

While some sections illustrated in FIGS. 4 through 12 do not have any variations, it should be recognized that the design of configuration module 12 and arrangement of the appropriate ports into discrete receptacles allows for any amount of variation in each of functional section 30. Functional sections 30 can be physically exchanged with other functional sections 30 with configuration module 12 to provide for operator specification demands. The physical exchanging of functional sections 30 does not affect other functional sections 30 nor does it require any changes to BP control module 14, BC control module 16, MU pipe control module 18, backup ER control module 20, and backup BC control module 22 can remain the same. The exchanging of functional sections 30 can thus vary or customize the functionality of EAB system 10 without requiring a change to any of the control modules. The control modules may change to account for variations, but the need to do so is minimized by the use of configuration module 12. In most cases, the only variation is the configuration module 12, minimizing the number of possible system permutations and minimizing the need for specialized control modules.

A user of the present invention may thus install a plurality of brake system control modules and a configuration module coupled to the plurality of brake system control modules, wherein the configuration module has a receptacle interface configured to engage a series of sections performing a series of corresponding dedicated air brake functions, select a desired series of sections from a plurality of options for each section, and then assemble the selected series of sections to the receptacle interface to form a complete EAB system 10 that has the desired functionality without having to have individual and application specific control modules.

The present invention can thus have a positive impact on many areas of the lifecycle of an EAB system. From a design perspective, the variant designs that exist are limited to assembly drawings of a superset bill of material for the maximum configuration. The testing can be featured based on the chosen configuration as a subset of the maximum functionality. By limiting the design differences to configuration module 12, the design process for BP control module 14, BC control module 16, MU pipe control module 18, backup ER control module 20, and backup BC control module 22 can be streamlined. With respect to lead times, the only variable part among EAB systems is configuration module 12, so maintenance and repair of BP control module 14, BC control module 16, MU pipe control module 18, backup ER control module 20, and backup BC control module 22 is simplified and uniform across all operators. Customization is also easier as only configuration module 12 needs to be reconfigured and can be finished after delivery to a customer or easily changed in the future. Less stock is also required to support maintenance and repair and the opportunity for improper installation or repair reduced. Additionally, the use of configuration module 12 allows for BP control, BC control, and MU pipe control functions to be consolidated into fewer modules. For example, ER and BP control functions can be contained in a single physical module.

The method of claim 14, wherein the dedicated functions comprise brake pipe cutout, equalizing reservoir backup, brake pipe emergency, automatic flow calibration, dead engine regulator, dynamic brake interlock, emergency limiting valve regulation, dynamic brake interlock and emergency limiting valve regulation, 20 pipe back up (20BU), and brake cylinder cutout.

As described above, the present invention may be a system, a method, and/or a computer program associated therewith and is described herein with reference to flowcharts and block diagrams of methods and systems. The flowchart and block diagrams illustrate the architecture, functionality, and operation of possible implementations of systems, methods, and computer programs of the present invention. It should be understood that each block of the flowcharts and block diagrams can be implemented by computer readable program instructions in software, firmware, or dedicated analog or digital circuits. These computer readable program instructions may be implemented on the processor of a general purpose computer, a special purpose computer, or other programmable data processing apparatus to produce a machine that implements a part or all of any of the blocks in the flowcharts and block diagrams. Each block in the flowchart or block diagrams may represent a module, segment, or portion of instructions, which comprises one or more executable instructions for implementing the specified logical functions. It should also be noted that each block of the block diagrams and flowchart illustrations, or combinations of blocks in the block diagrams and flowcharts, can be implemented by special purpose hardware-based systems that perform the specified functions or acts or carry out combinations of special purpose hardware and computer instructions.

What is claimed is:
1. An electronic air brake system, comprising:
a plurality of brake system control modules; and
a configuration module coupled to the plurality of brake system control modules and having a plurality of pressure ports in a receptacle interface that allows the plurality of brake system control modules to engage a series of sections of the configuration module, each of which has a plurality of pneumatic lines and a set of internal pneumatic components connected to the plurality of pressure ports so that the series of sections can operatively interact with the plurality of brake system control modules to accomplish a series of corresponding dedicated air brake functions using the plurality of pneumatic lines and the set of internal pneumatic components.
2. The electronic air brake system of claim 1, wherein the receptacle interface comprises a brake pipe relay output pressure port, a brake pipe feedback pressure port, a brake pipe vent valve pressure port, a brake pipe pressure port, and a brake pipe cutout pilot pressure port.

3. The electronic air brake system of claim 1, wherein the receptacle interface comprises a main reservoir pressure port, a 10 pipe pressure port, a brake pipe relay pilot port, a brake pipe electronic control pressure in port, a brake pipe electronic control pressure out port, a pneumatic equalizing reservoir pressure port, a reduction limiting valve pressure port, an equalizing reservoir backup exhaust port, an equalizing reservoir backup out port, and a PVPL pressure port.

4. The electronic air brake system of claim 1, wherein the receptacle interface comprises a 21 pipe pressure port and a brake pipe pressure port.

5. The electronic air brake system of claim 1, wherein the receptacle interface comprises a brake pipe pressure port.

6. The electronic air brake system of claim 1, wherein the receptacle interface comprises a main reservoir pressure port and a brake pipe pressure port.

7. The electronic air brake system of claim 1, wherein the receptacle interface comprises a main reservoir pressure port, a 13 pipe port, and a bail off pressure port.

8. The electronic air brake system of claim 1, wherein the receptacle interface comprises a main reservoir pressure port, a brake pipe pressure port, a bail off pressure port, and an emergency limiting valve pressure port.

9. The electronic air brake system of claim 1, wherein the receptacle interface comprises a distributor valve pressure port, an emergency limiting valve pressure port, a first brake cylinder back up pressure port, and a second brake cylinder back up pressure port.

10. The electronic air brake system of claim 1, wherein the receptacle interface comprises a pilot valve for power loss pressure port, a 20 pipe pressure port, and a brake cylinder one pressure port.

11. The electronic air brake system of claim 1, wherein the receptacle interface comprises a first brake cylinder cutout pressure port and a second brake cylinder cutout pressure port.

12. The electronic air brake system of claim 1, wherein the plurality of brake system control modules comprises a brake pipe control module, brake cylinder control module, multiple unit pipe control module, backup equalizing reservoir control module, and a backup brake cylinder control module.

13. A method of providing an electronic air brake system, comprising the steps of:
providing a plurality of brake system control modules and a configuration module coupled to the plurality of brake system control modules and having a plurality of pressure ports in a receptacle interface that allows the plurality of brake system control modules to engage a series of sections of the configuration module, each of which has a plurality of pneumatic lines and a set of internal pneumatic components that may be connected to the plurality of pressure ports so that the series of sections can operatively interact with the plurality of brake system control modules using the plurality of pneumatic lines and the set of internal pneumatic components to accomplish a series of corresponding dedicated air brake functions;
selecting the series of sections from a plurality of optional sections; and
assembling the selected series of sections to the receptacle interface to form a complete air brake system.

\* \* \* \* \*